United States Patent

[11] 3,536,223

[72] Inventors Friedrich Muhlhoff
Cologne-Bickendorf, Germany, and
Wilhelm Hammes, Seelscheid, near
Siegburg, Germany
[21] Appl. No. 759,370
[22] Filed Sept. 12, 1968
[45] Patented Oct. 27, 1970
[73] Assignee Mauser Kommandit-Gesellschaft
Cologne, Germany
[32] Priority Sept. 15, 1967, July 8, 1968
[33] Germany
[31] 1,607,887 and 1,761,791

[54] MOLDED PLASTIC CONTAINER
7 Claims, 4 Drawing Figs.
[52] U.S. Cl. .................................................. 215/1,
D9/164, 215/31, 215/37
[51] Int. Cl. .................................................. B65d 1/42
[50] Field of Search ......................................... 215/1(.5),
31, 10; 150/.5; D9/44, 45, 103(Inquired)

[56] References Cited
UNITED STATES PATENTS

| | | | |
|---|---|---|---|
| D198,407 | 6/1964 | Busch | 215/1UX |
| 2,013,243 | 9/1935 | Landon | 150/.5UX |
| 2,982,450 | 5/1961 | Whitton | 215/1(.5)UX |
| 3,212,663 | 10/1965 | Greenwell | 215/31 |
| 3,335,891 | 8/1967 | Bailey | 215/31 |

FOREIGN PATENTS 978,705 12/1964 Great Britain ........... 215/1.5(1160)UX

*Primary Examiner*—Donald F. Norton
*Attorney*—Michael S. Striker

ABSTRACT: A molded plastic container has an opening. A circumferential wall diverges in direction axially away from the opening and has an inner side. A circumferential bead surrounds the opening so that a closing foil of synthetic plastic material or the like may welded thereto for closing the container. An annular collar projects from the inner side of the circumferential wall transversely of the opening at a location radially and axially inwardly spaced from the bead.

Patented Oct. 27, 1970　　3,536,223

INVENTORS:
FRIEDRICH MÜHLHOFF
WILHELM HAMMES

By: Michael S. Striker
Attorney

MOLDED PLASTIC CONTAINER

BACKGROUND OF THE INVENTION

The present invention relates to plastic containers in general, and more particularly to molded plastic containers. Still more specifically the present invention relates to blow-molded plastic containers.

It is conventional to close plastic containers, which may serve for storage and transportation of fuel, chemicals and other substances, by providing a screw cap, a snap-on cap or a cap which is connected with the container by upsetting portions of the cap material around a suitable flange provided on the container. Recently it is becoming more and more accepted, however, to substitute for this type of closure another which simply consists of a piece of sheet material which is bonded, usually welded, to the container so that the same is closed. The reasons for this are readily understandable, it being evident that the separate manufacture of the previously customary type of closure is more expensive especially because the closure must then still be connected with the container, and also because depending upon the type of material from which the closure or the container is made dimensional changes may occur during storage which will prevent the closure from providing a tight seal.

While thus the weld-on type of closure, consisting of a piece of sheet material, has become more and more accepted because it is not made to precisely calculated dimensions so that it is immaterial if it undergoes dimensional changes, this type of closure itself is not without problems.

This type of closure, which hereafter will be designated as a closure foil for purposes of convenience without any intention of limitations as to strength, thickness, or the like, usually consists of aluminum at least one side of which is coated with a synthetic plastic material. It is this side which is placed into contact with the material of the plastic container and is thereupon welded thereto under the influence of pressure and heat. Evidently, if the welded connection is not perfect, that is if the material of the container surrounding the opening to be closed should yield even slightly under the influence of the pressure exerted during the welding process or if other factors intervene, the weld may not be absolutely uniform and homogenous with the result that the closure is not proper. This is particularly bothersome in the many instances where it is necessary that the closed container be able to withstand sudden increases in interior pressure.

On the other hand, it is not possible to simply search for solutions to this problem without also considering certain other factors which are involved. Firstly, such containers are usually thin-walled and cannot withstand significant stresses without buckling. On the other hand, it is necessary that these containers as most containers, be capable of stacking during transportation and storage. This latter requirement, however, necessitates that containers of this type be capable of withstanding sudden loads which occur especially during transportation, even though the container is of thin-walled construction. To avoid this problem, containers of the type under discussion have been developed in which the upper container end provided with the container opening terminates in a short neck whose wall extends either normal or oppositely to the shoulder portion of the container. The circumferential edge portion of the neck is extended radially outwardly and then inwardly folded so as to provide an annular flange which surrounds the opening. This flange is provided with a raised bead having a flat contact surface onto which the closure foil is welded.

For various reasons this is not satisfactory. First of all, when the welding pressure is exerted on this construction the flange has a tendency to yield in axial direction of the container with the result that the contact surface on the bead may be in irregular engagement with the closure foil when the welding takes place. This in turn results in uneven heating of the material and the weld may not be homogenous. Other problems also exist with this construction and are well enough known to those skilled in the art so as not to require detailed discussion.

For all of these reasons it is an object of the present invention to provide a molded plastic container which is not subject to these disadvantages and others known from the art.

An additional object of the invention is to provide such a container wherein no yielding of the container wall will take place when welding pressure is exerted so as to assure that a perfect homogenous weld is obtained. The welding pressure, as well as later pressures resulting from stacking or the like, is to be so diverted into the container wall that no yielding and no buckling will occur, at least not of any significant extent.

SUMMARY OF THE INVENTION

One feature of our invention recites, in accordance with the above objects and others which will become apparent hereafter, in the provision of a molded plastic container having an opening and comprising a circumferential wall which diverges in direction axially away from this opening and has an inner side. A circumferential bead surrounds this opening and is adapted to have a closure foil bonded thereto for closing the opening. Finally, an annular collar projects from the inner side of the circumferential wall transversely of the opening at a location radially and axially inwardly spaced from the bead.

In accordance with a further feature of our invention the generally cylindrical container is so configurated that its outer circumferential wall is concave in that it tapers in the direction towards its opposite ends from the middle of the container. At two diametrically opposite sides the wall is provided with two depressions or recesses which extend in longitudinal direction of the container and bulge into the interior thereof, these recesses being thus concave in longitudinal direction of the container as well as in circumferential direction of the container.

With the construction according to our present invention axially loads acting upon the container, for instance when welding pressure is exerted upon the aforementioned bead, are almost complete transmitted into the container wall as a result of the fact that the wall diverges substantially continuously in direction axially away from the bead. This stabilizes the wall in the region of the opening, a fact which is further enhanced by the provision of the bead so located as to constitute the outer periphery of the opening whereby a uniform resistance to pressure during the welding process is obtained and a nonuniform yielding of the contact zone defined by the bead is avoided. It is particularly advantageous that this construction makes it possible to configurate the contact zone in form of a narrow ridge or bead because this reduces the welding time and temperature as a result of the line contact thus obtained.

Provision of the annular collar further stabilizes the circumferential wall in the region of the opening, especially in circumferential direction. As a result of the fact that the collar is somewhat inwardly spaced from the bead it constitutes, after the welded seam starting from welding of the closure foil to the bead has been somewhat smoothed, a supporting surface for the closure foil.

On the other hand, the concave–convex cross-sectional configuration of the container obtained by making the latter convex but providing it with the longitudinally and circumferentially convex aforementioned recesses, assures that the welding pressure as well as other pressures resulting from stacking or the like, which are transmitted to the circumferential wall of the container, will not result in buckling of this wall despite the small thickness thereof. By this configuration we obtain a uniform stress distribution in the container wall which assures, as a result of the fact that the portion of the container which is convex in cross section is also convex in axial direction whereas that portion which is concave in cross section is also concave in axial direction, that the container can withstand loads whose magnitude is substantially one and one-half times greater than heretofore possible, as has been determined by tests.

We have found it advantageous that the concavo-convex cross section of the container be transformed into a substantially circular cross section at the end regions of the container; this not only facilitates stress distribution in these regions but also makes it possible for the container to readily roll or turn in printing and filling installations where this may be of importance.

The novel features which are considered as characteristic for the invention are set forth in particular in the appended claims. The invention itself, however, both as to its construction and its mode of operation, together with additional objects and advantages thereof, will be best understood from the following description of specific embodiments when read in connection with the accompanying drawing.

DESCRIPTION OF THE PREFERRED EMBODIMENTS

Figure 1:
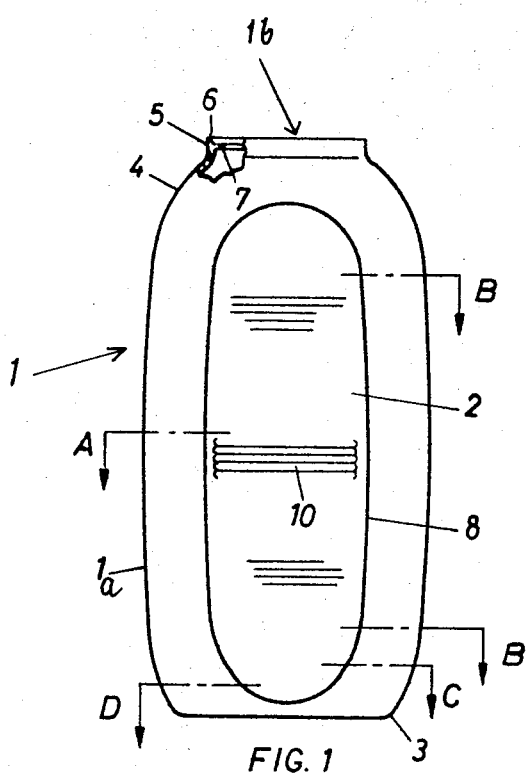
FIG. 1 is a somewhat diagrammatic side-elevational view, partly in section, of a container according to the present invention.
Figure 2:
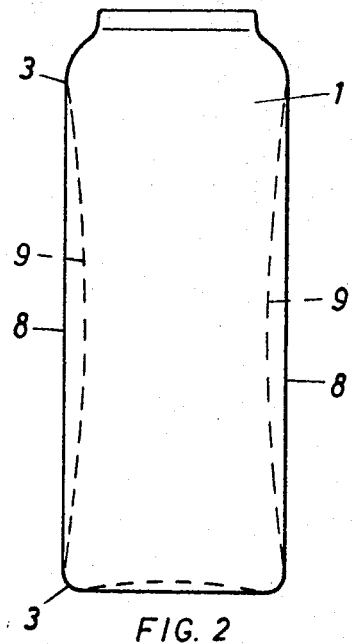
FIG. 2 is a view similar to FIG. 1, but illustrating the container turned about its vertical axis through 90°.
Figure 3:
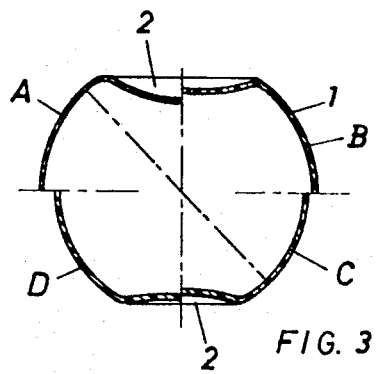
FIG. 3 is a composite illustration of the cross-sectional views taken on the lines A,B,C and D of FIG. 1.

Discussing now the drawing in detail it will be seen that the novel container is generally identified with reference numeral 1. Its circumferential wall is identified with reference numeral 1a and the opening through which the contents of the container are introduced and subsequently evacuated, and which opening is to be closed with a closure foil, is identified with reference numeral 1b. It will be seen from FIG. 1 that the container 1 is of generally cylindrical configuration but is convex in longitudinal direction, tapering in the direction towards the opposite end portions. FIGS. 1—3 indicate that at diametrically opposite locations the container 1, or rather the circumferential wall 1a thereof, is provided with two inwardly bulging depressions or recesses 2 which, as FIGS. 2 and 3 clearly indicate, are concave both in longitudinal direction of the container and in circumferential direction thereof.

Figure 4:
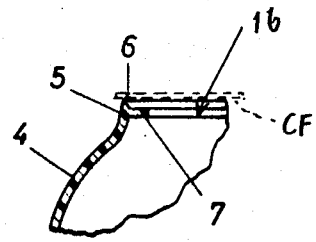
FIG. 4 is a sectioned fragmentary detail view of FIG. 1, on an enlarged scale.

The upper end portion 4 of the circumferential wall 1a, that is the end portion at which the opening 1b is provided, converges substantially continuously in the direction towards the opening 1b or, conversely, it may be said that it diverges substantially continuously in the direction away from the opening 1b. It terminates in a slightly conical portion 5 which in turn terminates in a circumferential bead 6. While not illustrated in detail because not essential for the purposes of the present invention, it will be understood (and is suggested by broken lines in FIG. 4) that the closure foil C will be laid over the opening 1b and will be welded to the bead 6. A slight distance inwardly of the bead 6 an annular collar 7 (compare FIGS. 1 and 4) projects radially inwardly from the inner side of the circumferential wall 1a. The rounding of the container at the opposite end is identified with reference numeral 3.

FIG. 2 shows clearly at 9 how the bottom wall of each of the recesses is inwardly concave and that the recesses 2 are bounded at opposite lateral sides by straight lines 8 against which an adjacent container can abut.

FIG. 3, finally, is a composite illustration showing the cross-sectional configuration of the container of FIG. 1 taken at different levels, respectively indicated by reference designations A, B, C and D. From FIG. 3 it is clearly evident that intermediate the opposite axial ends of the depressions 2 the cross-sectional configuration of the container 1 in planes extending transversely of the elongation of the container is concavo-convex, but that in the region of the opposite end portions of the container 1, that is intermediate the axial ends of the recesses 2 and the axial ends of the container 1, the cross-sectional configuration in planes intersecting the container transversely is substantially circular. As shown in FIG. 1 the recesses are provided within their respective confines with reinforcing ribs 10. This further stabilizes the circumferential wall in the region of the recesses, that is within the confines of the same.

For purposes of complete understanding and illustration it should be pointed out that in FIG. 3 the dot–dash lines indicated suggest the parting lines of mold sections in blow molds by means of which the container according to the present invention is made.

Without further analysis, the foregoing will so fully reveal the gist of the present invention that others can by applying current knowledge readily adapt it for various applications that, from the standpoint of prior art, fairly constitute essential characteristics of the generic or specific aspects of this invention.

We claim:

1. A molded plastic container, comprising an elongated outwardly convex circumferential wall including a substantially cylindrical main portion and spaced end portions, each of said end portions converging substantially continuously in direction away from said main portion so that said end portions are reinforced by virtue of their respective convergence; and a pair of elongated reinforcing depressions provided in said wall at opposite sides of said container, each of said depressions being concave inwardly of said wall both longitudinally and circumferentially of the same and extending continuously from one of said convergent end portions all the way to the other of said convergent end portions.

2. A container as defined in claim 1, having an axially directed opening in one of said end portions; further comprising a circumferential welding bead surrounding said opening and being adapted to have a closure foil welded thereto; and an annular collar projecting from the inner side of said wall transversely of said opening at a location radially and axially inwardly of said bead.

3. A container as defined in claim 2, said bead and said collar being of one piece with said one end portion.

4. A container as defined in claim 1, said container being of concavo-convex cross section in transverse planes intersecting it intermediate the opposite ends of said depressions.

5. A container as defined in claim 4, said container being of substantially circular cross section in transverse planes intersecting it in said end portions between the respective ends of said depressions and the respectively adjacent end of said container.

6. A container as defined in claim 1; and further comprising additional reinforcing means provided on said circumferential wall within the confines of the respective depressions.

7. A container as defined in claim 6, said reinforcing means comprising a plurality of reinforcing ribs extending transversely of the elongation of the respective depressions.